Jan. 21, 1930.  J. BURNETT  1,744,209
ELECTRICAL PANEL BOARD
Filed July 1, 1925  2 Sheets-Sheet 1
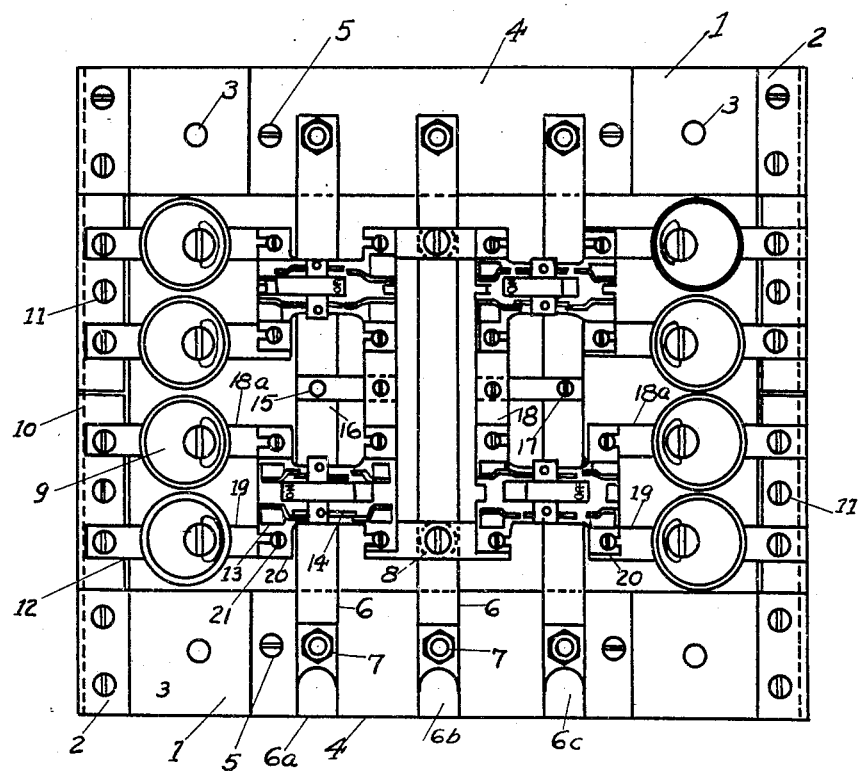
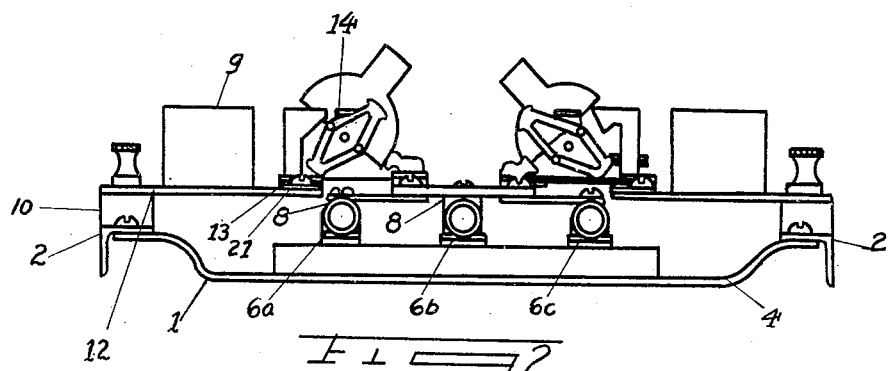
INVENTOR
John Burnett
BY
ATTORNEYS Jan. 21, 1930.  J. BURNETT  1,744,209
ELECTRICAL PANEL BOARD
Filed July 1, 1925  2 Sheets-Sheet 2

INVENTOR
John Burnett
BY
Allen & Allen
ATTORNEYS

Patented Jan. 21, 1930

1,744,209

UNITED STATES PATENT OFFICE

JOHN BURNETT, OF LUDLOW, KENTUCKY; ELIZABETH M. A. BURNETT EXECUTRIX OF SAID JOHN BURNETT, DECEASED

ELECTRICAL PANEL BOARD

Application filed July 1, 1925. Serial No. 40,790.

My invention relates to electrical panel boards, particularly of the type which are enclosed in cabinets with doors opening in the cabinets through which the switches may be turned on and off and through which the fuses may be renewed.

It is my object to provide a panel board construction in which bus bars disposed with sufficient interspacing to conform to underwriters' requirements are arranged to support a series of switches and other interconnecting electrical elements. By eliminating the cumbersome and expensive dielectric mounting panels common to the art, it is, therefore, my object to provide a skeleton panel board which may easily be assembled by an electrical supply house without the necessity of providing any molded dielectric pieces.

The manufacture of panel boards has necessitated a very expensive outlay for the provision of molded mounting members through which electrical lines are disposed which require an extensive amount of bending. It is my further object in my novel skeleton construction to provide for readily demountable units which will accommodate fuses of screw or cartridge type with a simple adjustment of several screws.

Referring to the drawings in which I have illustrated a preferred arrangement of panel board for use with three wire alternating current and on which four units and switches are mounted:—

Figure 1 is a top plan view of the assembly.

Figure 2 is a side elevation.

Figure 3:
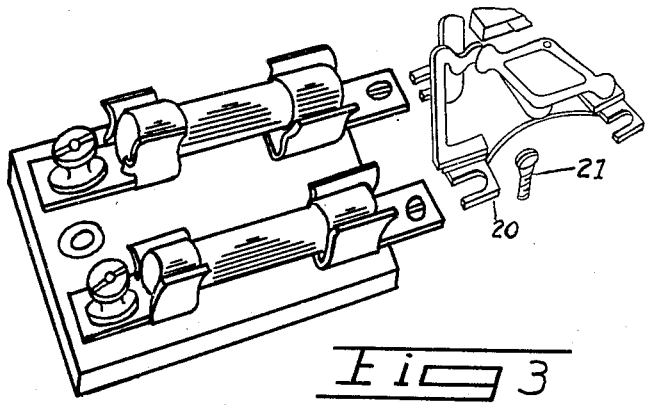
Figure 3 is a perspective view of a cartridge type fuse unit, with a portion of the switch illustrating the method of mounting the unit.
Figure 4:
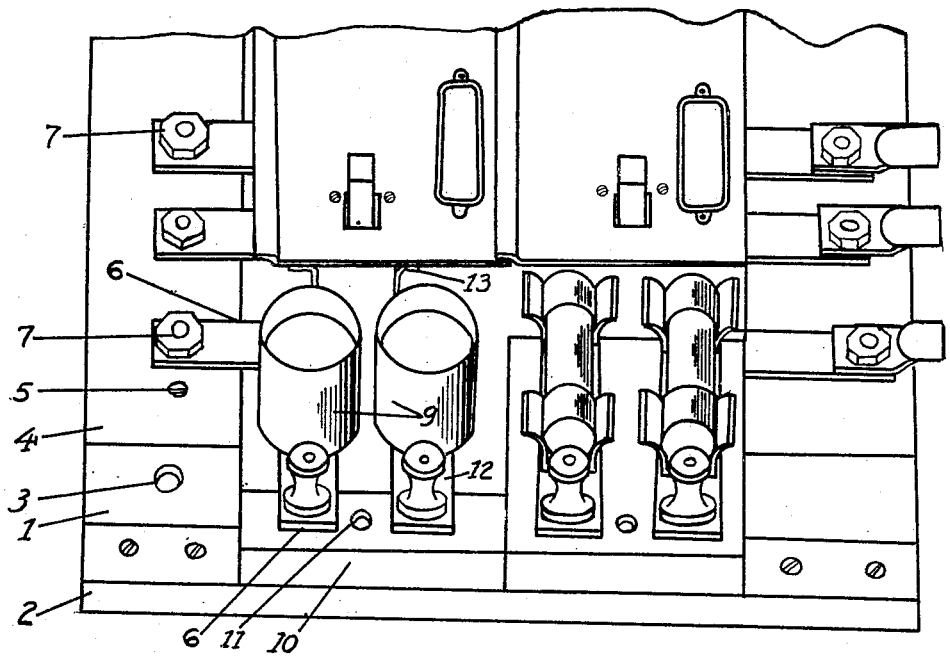
Figure 4 is a perspective view of a portion of the assembly showing the interchangeable, readily demountable feature of the supporting structure with a unit of screw type fuses and a unit of cartridge type fuses mounted on the panel board, and the outer cover members in position covering the switch units.

Generally indicated at 1 are the back supporting pieces which are preferably pieces of metal extending longitudinally of the panel with angle members 2 mounted on bent-in ends of the pieces. The side and end pieces may be conveniently mounted in the cabinet by screws adapted to extend through holes 3 in the side pieces. Blocks of dielectric material 4 are suitably mounted on the metal pieces 1 with screws or bolts as indicated at 5. The electric lines transmitting electrical power to the panel board may be connected in a three wire A. C. or two wire D. C. system to bus bars 6 which extend across between the pieces of dielectrical material. The electric lines may be connected with the bus bars by mounting bolts 7 which are firmly imbedded in the dielectric blocks, but which do not extend to within a quarter of an inch of the metallic side pieces 1. In my preferred arrangement the support for the switches is provided by a series of conductive posts 8 which extend up from the bus bars. The fuse units indicated at 9, are mounted on dielectric blocks 10 which are secured with screws 11 to the angle members forming the ends of the panel board. The wiring plan illustrated comprises outside line connecting with one end bus bar as indicated at 6$^a$, a middle line connecting with the central bus bar as indicated at 6$^b$ and another outside line connecting with the bus bar 6$^c$ opposite the bus bar 6$^a$.

From the conductive blocks extending from the neutral bus bar, strips 12 connect with one of the outlet terminals 13 of the switches indicated at 14 on the opposite sides of the panel. These strips not only serve as connectors but they form rigid supports for one side of each of the switches. The positive bar on one side has conductive blocks 15 which connect with strips 16 which mount and connect with the inlet terminals to the switch on the left side of the board. On the right side of the board similar conductive blocks 17 connect the negative bus bar with strips 18 which connect with the inlet terminals of the switches on the right side of the board.

The supports for the fuse sockets which are connected with the switches are formed by conductive strips indicated at 18$^a$ with other conductive strips 19 extending from the opposite sides of the fuse sockets to the switches. These strips like the strips from the bus bars are sufficiently rigid to support the fuse sockets and they further serve as excellent conductors for the current.

The preferred mounting for the fuse units and the switches is to have the switches provided with terminals 20 formed of grooved pieces screwed to the switches and extending out from the sides thereof so that the connections may be made between the fuse units and the switch units by unloosening the screws 21 connecting the grooved extending pieces 20 from the switches and inserting the pieces 18ª and 19 from the fuse units, and tightening the screws 21 to hold the assembly rigidly in position. Both ends of the switches are provided with grooved terminals so that it will be understood that the switch units are demountable with or without the fuse units. This provides a very simple structure which can be manufactured by small assembling plants, as readily as large plants who have sufficient volume of business to warrant the heavy expenditure necessary for dies and molds for forming panels from suitable dielectric material.

It will be observed that in the entire assembly all of the supporting strips and electrical conductive pieces from the switch units and the fuse units are straight pieces of metal which further simplify the assembly of a panel board. It will be further understood that different arrangements may be adapted for use with different types of panels without departing from the principle of my skeleton structure with demountable switch and fuse units in the assembly.

Having thus described my invention, what I claim as new and desire to secure by Letters Patent, is:—

1. A skeleton panel board comprising in combination metallic backing members outlining the sides of the panel with blocks of dielectric material secured to the backing members on opposite sides of the panel, main line bus bars extending across the panel supported by said blocks at opposite sides of said panel board and other blocks of dielectric material secured to said backing members, switch units, fuse units and load lines leading from said fuse units, said last named blocks supporting said load lines, and means for supporting said fuse units and switch units between the last named blocks of dielectric material and the bus bars extending across the panel.

2. A skeleton panel board comprising in combination metallic backing members outlining the sides of the panel with blocks of dielectric material secured to the backing members on opposite sides of the panel, main line bus bars extending across the panel, supported by said blocks at opposite sides of said panel board and other blocks of dielectric material secured to said backing members, switch units, fuse units and load lines leading from said fuse units, said last named blocks supporting said load lines, and means for supporting said fuse units and switch units between the last named blocks of dielectric material and the bus bars extending across the panel, with individual unit assemblies of switch and fuse units demountable separately and in combined assemblies of switches and fuse units.

3. A skeleton panel board comprising in combination a plurality of fuse units, and a plurality of switch units with electrical load lines and main lines suitably connected to the several fuse units and switch units, and means for mounting said units and electrical lines comprising metallic pieces forming a rectangular frame for the panel, bus bars and blocks of dielectric material mounted on said frame and supporting said bus bars, said bus bars forming the only central support for the fuse and switch units, said bars extending in parallel alignment straight across said frame, and other blocks of dielectric material forming end supports for said fuse and switch units.

4. In a skeleton panel board, separable switch units, separable fuse units, and bus bars, extended straight across between opposite sides of the board, means for mounting said units in suspended positions between the remaining two sides of the board and said bus bars, said means comprising conductive strips sufficiently stiff to support said switch and fuse units, and said switch units being provided with slotted terminals adapted to slidingly engage said conductive strips and conductive strips extended from said bus bars.

JOHN BURNETT.